United States Patent [19]

Aggarwal et al.

[11] 4,063,105

[45] Dec. 13, 1977

[54] METHOD OF AND APPARATUS FOR GENERATING TUNABLE COHERENT RADIATION BY NONCOLLINEAR PHASE-MATCHED SUM-DIFFERENCE FREQUENCY OPTICAL MIXING

[75] Inventors: Roshan L. Aggarwal, Burlington; Neville K. S. Lee, Framingham; Benjamin Lax, Chestnut Hill, all of Mass.

[73] Assignee: Massachusetts Institutes of Technology, Cambridge, Mass.

[21] Appl. No.: 699,557

[22] Filed: June 24, 1976

[51] Int. Cl.² .............................................. H02M 5/04
[52] U.S. Cl. .................................... 307/88.3; 330/4.5
[58] Field of Search ....................................... 307/88.3

[56] References Cited

U.S. PATENT DOCUMENTS 3,795,819  3/1974  Harris ................................. 307/88.3

OTHER PUBLICATIONS

Patel et al., "Physical Review Letters," Nov. 7, 1966, pp. 1011–1014.
Wyhne et al., "Applied Physics Letters," Mar. 1, 1968, pp. 191–192.

*Primary Examiner*—Rudolph V. Rolinec
*Assistant Examiner*—Darwin R. Hostetter
*Attorney, Agent, or Firm*—Arthur A. Smith, Jr.; Robert Shaw

[57] ABSTRACT

Schemes for generating tunable coherent radiation by noncollinear phase-matched sum-difference frequency optical mixing in a nonlinear medium for use, by way of illustration, in connection with uranium 235-isotope separation in $UF_6$.

18 Claims, 6 Drawing Figures

METHOD OF AND APPARATUS FOR GENERATING TUNABLE COHERENT RADIATION BY NONCOLLINEAR PHASE-MATCHED SUM-DIFFERENCE FREQUENCY OPTICAL MIXING

The Government has rights in this invention pursuant to Contract No. N00014-75-C-0558 awarded by the Advanced Research Projects Agency through the Office of Naval Research.

The present invention relates to schemes for developing tunable coherent radiation sources in the infrared region of the electromagnetic spectrum by optical mixing.

Attention is called to U.S. Pat. No. 3,869,618 (Lax et al) and to the art therein cited; and an application for Letters Patent Ser. No. 587,030 filed June 16, 1975 (Lax et al) now U.S. Pat. No. 3,986,403. Attention is also called to the following journal articles: "Noncollinear Phase-Matched Four Photon Mixing of $CO_2$ Laser Radiation in Germanium" (Lee et al), Optics Communications, Vol. 19, No. 1, December, 1976, pp. 401–403; "Noncollinear Phase Matching in GaAs" (Aggarwal et al), Appl. Phys. Lett., April 1973, Vol. 22, No. 7, pp. 329 et seq.; "Study of Optical Difference Mixing in Ge and Si Using a $CO_2$ Gas Laser," (Wynne et al), Appl. Phys. Lett., March 1968, Vol. 12, No. 5, pp. 191 et seq.; "Optical Nonlinearities Due to Mobile Carriers in Semiconductors," (Patel et al), Physical Review Letters, November 1966, Vol. 17, No. 19, pp. 1011 et seq.

The present invention involves sum-difference mixing, as the term is now defined, to provide optical radiation at a frequency $\omega_{sd}$. This frequency $\omega_{sd}$ of the radiation generated by the N-Photon sum-difference optical mixing using p laser beams is given by $$\omega_{sd} = (n_1\omega_1 + n_2\omega_2 + \ldots n_i\omega_i) - (n_{i+1}\omega_{i+1} + n_{i+2}\omega_{i+2} + \ldots n_p\omega_p) \quad (1)$$

where $\omega_1, \omega_2, \ldots \omega_i, \omega_{i+1}, \omega_{i+2}, \ldots \omega_p$ represent frequencies of input laser beams to be mixed, as later discussed; $n_1, n_2 \ldots n_p$ are integers and satisfy the following relationships $$(n_1 + n_2 + n_3 \ldots n_i) \geq 2, \quad (2a)$$

$$(n_{i+1} + n_{i+2} + n_{i+3} \ldots n_p) \geq 1, \text{ and} \quad (2b)$$

$$n_1 + n_2 + \ldots n_i + n_{i+1} \ldots n_p = N-1 \quad (2c)$$

In words, "sum-difference frequency optical mixing," as is used herein, produces output radiation at a frequency which is a combination of at least one addition and one subtraction of a plurality of frequencies of the input laser beams. In the special case, the addition can take the form of multiplication when some of the input frequencies are degenerate ; in which case, a lesser number of lasers are required for the mixing. For example, in the 4-photon sum-difference optical mixing, the general case would involve three input lasers with frequencies $\omega_1$, $\omega_2$ and $\omega_3$ and the corresponding $\omega_{sd}$ equal to $\omega_1 + \omega_2 - \omega_3$. In the particular case $\omega_1 = \omega_2$, $\omega_{sd}$ equals $\omega_1 + \omega_1 - \omega_3$ or $2\omega_1 - \omega_3$ and, in this case, only two input laser with frequencies $\omega_1$ and $\omega_3$ are required.

In the rapidly developing field of laser applications, there has arisen the need for high power laser radiation at very precise frequencies and at frequencies not in the range of high intensity primary laser sources now available. Hence, workers have resorted to nonlinear optical mixing techniques, in many instances, to obtain the necessary frequencies and, often, the necessary tunability, e.g., said Lax et al patents. This invention arose from an extension of the techniques disclosed in the Lax et al patents and represents an extension thereon in terms of the selection of the frequencies and power of the output radiation.

Accordingly, it is an object of the present invention to provide a laser system adapted to produce tunable coherent radiation in parts of the infrared region of the electromagnetic spectrum and, in particular, to produce infrared radiation at frequencies required for the uranium enrichment program in $UF_6$.

Another object is to provide a system wherein such coherent radiation can be produced in other regions of the spectrum as well.

These and still further objects are discussed hereinafter and are delineated in the appended claims.

The foregoing objects are achieved by a method of generating tunable coherent radiation by noncollinear optical sum-difference frequency mixing, as defined above. Sum-difference frequency mixing is in contrast to the "difference frequency mixing" in Lax et al U.S. Pat. No. 3,869,618 wherein the output frequency is just equal to the simple difference of the input frequencies. For difference frequency mixing, noncollinear phase-matching can be carried out only in nonlinear media which possess anomalous dispersion of refractive index between the frequencies involved. In contrast, for sum-difference frequency mixing, the noncollinear phase-matching does not necessarily require the presence of anomalous dispersion in the spectral region containing the input and the output frequencies. In other words, this sum-difference frequency mixing is a special class of mixing which can be phase-matched noncollinearly in a relatively large number of nonlinear substances and in many sectral regions. Therefore, this present scheme can provide high power, coherent radiation in the frequency regions that the noncollinear difference frequency mixing of the Lax et al patent 3,869,618 cannot provide efficiency, if at all.

The invention is hereinafter described with reference to the accompanying drawing in which.

One of the simplest and perhaps most important cases of sum-difference frequency mixing involves four photons wherein $$\omega_{sd} = \omega_1 + \omega_2 - \omega_3. \quad (3)$$

Figure 1:
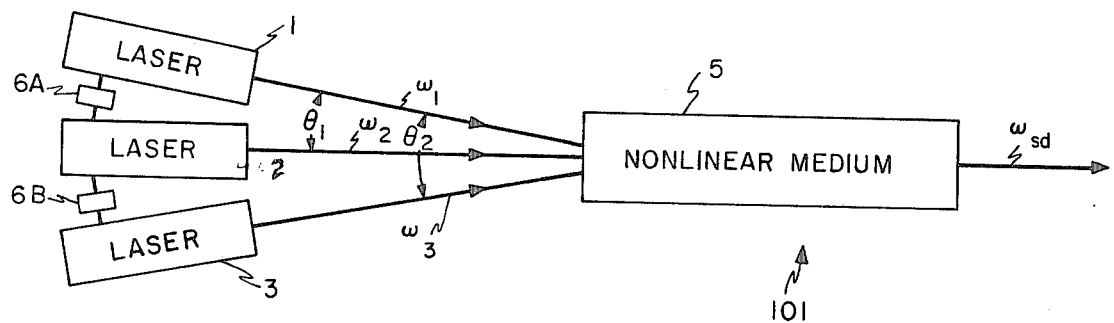
FIG. 1 is a schematic representation, block diagram in form, showing three lasers that provide input optical beams to a nonlinear medium for four-photon mixing.
Figure 2:
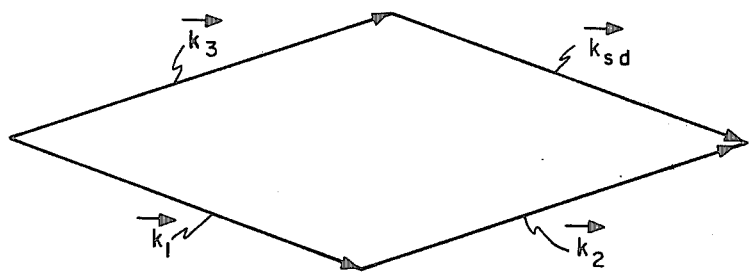
FIG. 2 is a wave vector diagram for achieving phase matching in the mixing process effected in the system of FIG. 1.

The conservation of momentum between four photons requires that $\vec{k}_{sd} = \vec{k}_1 + \vec{k}_2 + \vec{k}_3$, wherein $k_{sd}$ is the wave vector for the radiation generated at the frequency $\omega_{sd}$ and $\vec{k}_1$, $\vec{k}_2$, and $\vec{k}_3$ are the wave vectors for the radiation at input frequencies $\omega_1$, $\omega_2$, and $\omega_3$, respectively. The wave vector diagram for this four photon mixing is shown in FIG. 2. The block diagram of a step tunable system embodying the present inventive concept for the case of four-photon mixing is illustrated in FIG. 1. In the particular case $\omega_1 = \omega_2$ and $\vec{k}_1 = \vec{k}_2$, only two input laser beams are required (see FIG. 3); the resulting wave vector triangle for phase matching is shown in FIG. 4.

Referring now to FIG. 1 the apparatus labeled 101 is adapted to generate tunable coherent radiation at frequency $\omega_{sd}$ by noncollinear, nonlinear sum-difference frequency optical mixing and as above noted, the mixing process in the system 101 involves four photons. The system 101 comprises a first laser 1 to generate a first laser beam at the frequency $\omega_1$, a second laser 2 to generate a second laser beam at the frequency $\omega_2$ and a third laser 3 to generate a third laser beam at the frequency $\omega_3$. A nonlinear optical medium 5 is positioned to receive the first laser beam which excites a substantial volume thereof; the nonlinear medium 5 has a relatively large third order nonlinearity and small absorption coefficients at the frequencies $\omega_1$, $\omega_2$, $\omega_3$ and $\omega_{sd}$. (A good nonlinear medium is single crystal germanium.) The second and third beams are directed at certain angles and to at least a substantial part of the same portion of the nonlinear medium 5 as is excited by the first beam, the three beams being mixed in the nonlinear medium to provide said sum-difference frequency $\omega_{sd}$. Means 6A and 6B are provided to adjust the angle $\theta_1$ therein between the first and second beams as well as the angle shown at $\theta_2$ between the first and third beams to achieve the phase-matching necessary for efficient generation of the radiation at the sum-difference frequency $\omega_{sd}$.

Figure 5:
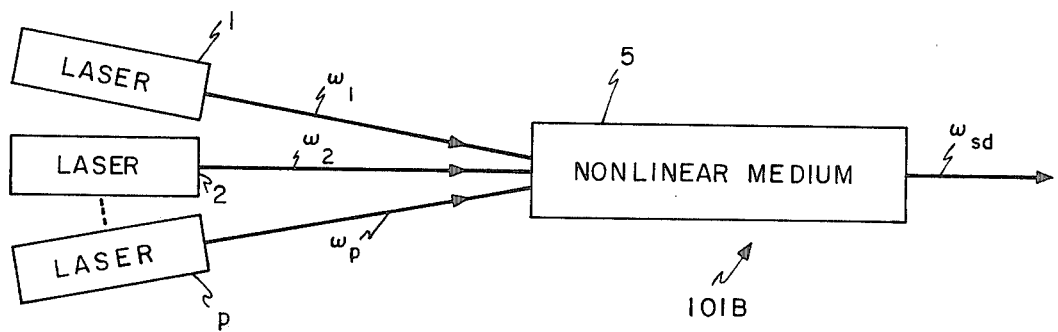
FIGS. 5 and 6 are schematic representations, block diagram in form, showing further modifications of the system of FIG. 1.

One of the important applications of the present invention is to produce high power coherent infrared radiation for the enrichment of uranium in $UF_6$. In this case, the input laser beams can be grating tuned $CO_2$ lasers because of their spectral region along with high peak power as well as high efficiency. Germanium is a good candidate for the nonlinear medium because of its relatively large third order nonlinearity, its relatively high transparency in the 8.62 to 12.1 $\mu m$ regions and its availability (commercially) in single crystals of high purity of germanium; the inventors have experimantally demonstrated the principle of the noncollinear phase-matched sum-difference frequency mixing. This sum-difference mixing process can be repeated several times (see FIG. 6) such that the output frequency obtained in the first mixing with some of the original input frequencies to produce a new frequency in the second stage, and so on. In addition, the folded geometries in Lax et al application Ser. No. 587,030 can be applied to increase the mixing efficiency in some cases. In addition, a further generalization of the present scheme can be made for sum-difference frequency mixing involving more than four photon processes, as shown in FIG. 5.

Figure 3:
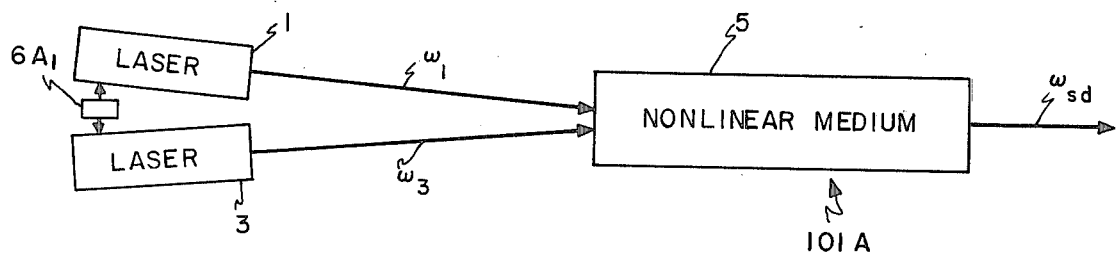
FIG. 3 is a schematic representation, block diagram in form, showing a modification of the system of FIG. 1.
Figure 4:
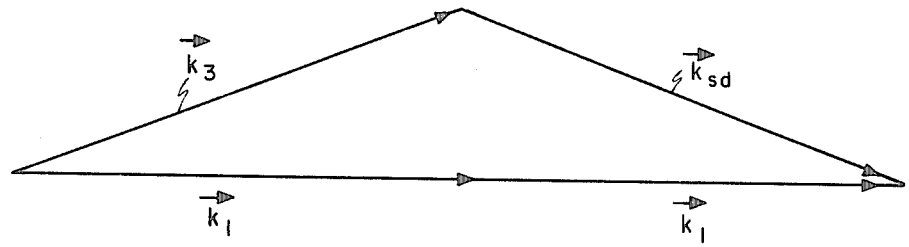
FIG. 4 is a wave vector diagram for achieving phase matching in the mixing process effected in the system of FIG. 3.

The system marked 101A in FIG. 3 involves four-photon mixing using two laser beams. In the system 101A the output $\omega_{sd}$ equals $2\omega_1 - \omega_3$. Angular adjustment is accomplished by means labeled $6A_1$ which is a type of adjuster mechanism that is common in the laser art.

The system 101B illustrates the general case of noncollinear, nonlinear, N-photon, sum-difference mixing involving $p$ laser beams. In the system 101B there are $p$ input laser 1, 2 . . . $p$ to provide an output beam at frequency $\omega_{sd}$ that is a sum-difference frequency that involves at least one addition and one subtraction. The system 101B can involve four-photon mixing as in the system 101 of FIG. 1, but it can involve five-photon mixing, and so forth, up to N-photon mixing.

Figure 6:
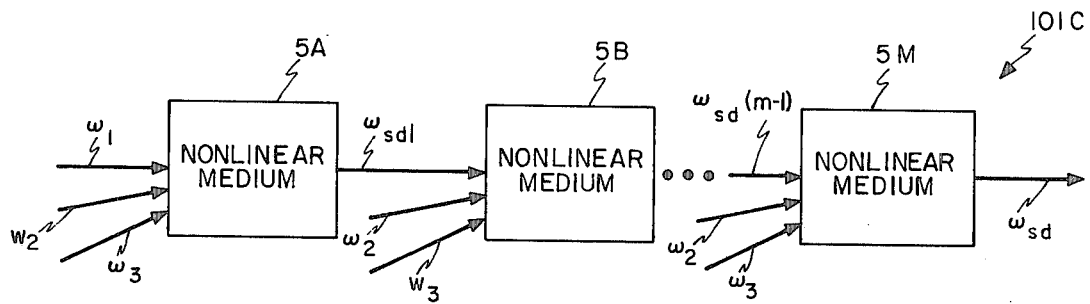

The system shown at 101C in FIG. 6 includes M nonlinear mixing media 5A, 5B . . . 5M. The first medium 5A receives beams as $\omega_1$, $\omega_2$ and $\omega_3$, as in the system 101, to produce an output beam at frequency $\omega_{sd1}$ that is the same as the frequency $\omega_{sd}$ of FIG. 1; the radiation at the frequency $\omega_{sd1}$ is one input to the said nonlinear optical medium 5B that receives two further inputs which again may be at the frequencies $\omega_2$ and $\omega_3$, that is, the first input to the medium 5B in FIG. 6, that corresponds to the input at the frequency $\omega_1$ in FIG. 1, is $\omega_{sd1}$. The output shown at $\omega_{sd(m-1)}$ of the nonlinear medium 5M−1 (not shown) is the first input to the nonlinear medium 5M. Of course, the second and third laser inputs to the nonlinear elements 5B . . . 5M need not be at frequencies $\omega_2$ and $\omega_3$. The cascade scheme of FIG. 6 is illustrated using four-photon mixing, but it can use N-photon mixing wherein N > 4.

Further modifications of the invention herein disclosed will occur to persons skilled in the art and all such modifications are deemed to be within the spirit and scope of the invention as defined by the appended claims.

What is claimed is:

1. A method of generating tunable coherent radiation at a frequency $\omega_{sd}$ by noncollinear four-photon sum-difference frequency optical mixing that comprises: generating first, second and third laser beams at frequencies $\omega_1$, $\omega_2$ and $\omega_3$, respectively, so that $\omega_{sd} = \omega_1 + \omega_2 - \omega_3$; directing the first beam upon a nonlinear medium, said medium having third order nonlinearity; directing the second and third laser beams at some certain angles and to at least a substantial part of the same portion of the nonlinear medium excited by the first beam, the beams being mixed in the nonlinear medium to provide the said sum-difference frequency; and adjusting the angle between the first and second beams as well as the angle between the first and third beams to achieve the phase matching necessary for efficient generation of the radiation at said sum-difference frequency $\omega_{sd}$.

2. A method as claimed in claim 1 wherein said nonlinear medium is crystalline and in which the sum-difference frequency $\omega_{sd}$ coincides with the infrared absorption frequencies necessary for isotope separation in $UF_6$, said frequency $\omega_{sd}$ corresponding to a wavelength in the 8.62 $\mu m$ and/or 12.1 $\mu m$ regions of the electromagnetic spectrum.

3. Apparatus for generating tunable coherent radiation at a frequency $\omega_{sd}$ by noncollinear nonlinear four-photon sum-difference frequency optical mixing, that comprises: means generating a first laser beam, a second laser beam, and a third laser beam of frequencies $\omega_1$, $\omega_2$ and $\omega_3$, respectively, so that $\omega_{sd} = \omega_1 + \omega_2 - \omega_3$; a nonlinear medium positioned to receive the beams which are directed upon the nonlinear medium in a noncollinear configuration to generate the sum-difference frequency radiation as an output from the nonlinear medium, said nonlinear medium having a third order nonlinearity; the first beam being directed upon the nonlinear medium, the second and third beams being directed at certain angles to the first beam and to at least a substantial part of the same portion of the nonlinear medium excited by the first beam, the beams being mixed in said portion of nonlinear medium to provide said sum-difference frequency $\omega_{sd}$; and means adjusting the angle between the first and second beams as well as the angle between the first and third beams to achieve the phase matching necessary for efficient generation of the radiation at the said sum-difference frequency $\omega_{sd}$.

4. Apparatus as claimed in claim 3 in which the nonlinear medium is germanium.

5. Apparatus as claimed in claim 3 in which the means generating the first, second and third laser beams each comprises a $CO_2$ gas laser.

6. Apparatus as claimed in claim 3 in which said means generating comprises first laser means, second laser means and third laser means generating, respectively, the first laser beam at frequency $\omega_1$, the second laser beam at frequency $\omega_2$ and the third laser beam at frequency $\omega_3$.

7. A method of generating tunable coherent radiation at frequency $\omega_{sd}$ by noncollinear nonlinear N-photon sum-difference frequency mixing using $p$ laser beams that comprise: generating a plurality of laser beams of frequencies $\omega_1, \omega_2 \ldots \omega_p$ such that $$\omega_{sd} = (n_1\omega_1 + n_2\omega_2 + \ldots n_i\omega_i) - (n_{i+1}\omega_{i+1} + n_{i+2}\omega_{i+2} + \ldots n_{i+j}\omega_p),$$

wherein $\omega_1, \omega_2 \ldots \omega_i, \omega_{i+1}, \omega_{i+2} \ldots \omega_p$ represent frequencies of input laser beams to-be-mixed, $n_1, n_2 \ldots$ are positive integers and satisfy the relationships $$(n_1 + n_2 \ldots n_i) \geq 2,$$

$$(n_{i+1} + n_{i+2} \ldots n_{i+j}) \geq 1, \text{ and}$$

$$n_1 + n_2 + \ldots n_i + n_{i+1} \ldots n_p = N-1;$$

directing the beam at the frequency $\omega_1$ upon a nonlinear optical medium, said nonlinear optical medium having an $(N-1)$th order nonlinearity and small absorption coefficients at the frequencies $\omega_1, \omega_2 \ldots \omega_p$; directing the laser beams at the frequencies $\omega_2 \ldots \omega_p$ at some certain angles and to at least a substantial part of the same portion of the nonlinear optical medium excited by the beam at the frequency $\omega_1$, the beams being mixed in the nonlinear optical medium to provide the sum-difference frequency $\omega_{sd}$; and adjusting the angle between the beams to achieve the phase matching necessary for efficient generation of the sum-difference frequency $\omega_{sd}$.

8. A system for generating tunable coherent radiation at frequency $\omega_{sd}$ by noncollinear nonlinear N-photon sum-difference frequency mixing using $p$ laser beams that comprises: means generating a plurality of $p$ laser beams of frequencies $\omega_1, \omega_2 \ldots \omega_p$ such that $$\omega_{sd} = (n_1\omega_1 + n_2\omega_2 + \ldots n_i\omega_i) - (n_{i+1}\omega_{i+1} + n_{i+2}\omega_{i+2} + \ldots n_p\omega_p),$$

wherein $\omega_1, \omega_2 \ldots \omega_i, \omega_{i+1}, \omega_{i+2} \ldots \omega_p$ represent frequencies of input laser beams to-be-mixed, $n_1, n_2 \ldots$ are positive integers and satisfy the relationships $$(n_1 + n_2 \ldots n_i) \geq 2,$$

$$(n_{i+1} + n_{i+2} \ldots n_p) \geq 1, \text{ and}$$

$$n_1 + n_2 + \ldots n_i + n_{i+1} \ldots n_p = N-1;$$

a nonlinear medium positioned to receive the beams which are directed upon the nonlinear medium in a noncollinear configuration to generate the sum-difference frequency radiation as an output from the nonlinear medium, said nonlinear medium having an $(N-1)$th order nonlinearity, the beam at the frequency $\omega_1$ being directed upon the nonlinear medium, the beam at frequency $\omega_2$ and any further beams being directed at certain angles to the beam at the frequency $\omega_1$ and to at least a substantial part of the same portion of the nonlinear medium excited by the beam at the frequency $\omega_1$, the beams being mixed in said portion of nonlinear medium to provide said sum-difference frequency $\omega_{sd}$.

9. A system as claimed in claim 8 wherein $N=4$ and $p=2$ to provide a system wherein said mixing is a four-photon process using two input laser beams to said medium.

10. Apparatus that includes a plurality of systems as claimed in claim 8 arranged in a cascade and wherein the output of one system provides one input to the succeeding system of the cascade.

11. Apparatus as claimed in claim 8 wherein said nonlinear medium is a crystalline medium having high transparency at said sum-difference frequency $\omega_{sd}$ and in which said beams are adapted to excite a substantial volume of the crystalline medium.

12. Apparatus as claimed in claim 11 wherein said crystalline medium is a single elongate crystal.

13. Apparatus as claimed in claim 12 wherein said single crystal is germanium.

14. Apparatus as claimed in claim 11 wherein the laser beams excite a substantial volume of the crystalline medium and in which at least one of the laser beams is high intensity.

15. Apparatus as claimed in claim 8 that includes means to adjust the angles of said beam at frequency $\omega_2$ and any further beams relative to the said beam at the frequency $\omega_1$ to achieve the phase matching necessary for efficient generation of the radiation at the sum-difference frequency $\omega_{sd}$.

16. Apparatus as claimed in claim 11 wherein said sum-difference frequency $\omega_{sd}$ corresponds to a wavelength at 8.62 $\mu$m.

17. Apparatus as claimed in claim 11 wherein said sum-difference frequency $\omega_{sd}$ corresponds to a wavelength at 12.1 $\mu$m.

18. Apparatus as claimed in claim 11 wherein $N = 4$.

* * * * *